United States Patent
Chen et al.

(10) Patent No.: US 11,586,912 B2
(45) Date of Patent: Feb. 21, 2023

(54) INTEGRATED NOISE GENERATION FOR ADVERSARIAL TRAINING

(71) Applicant: INTERNATIONAL BUSINESS MACHINES CORPORATION, Armonk, NY (US)

(72) Inventors: Chia-Yu Chen, White Plains, NY (US); Pin-Yu Chen, White Plains, NY (US); Mingu Kang, Old Tappan, NJ (US); Jintao Zhang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 672 days.

(21) Appl. No.: 16/657,263

(22) Filed: Oct. 18, 2019

(65) Prior Publication Data

US 2021/0117771 A1    Apr. 22, 2021

(51) Int. Cl.
*G06N 3/08* (2006.01)
*G06N 3/063* (2006.01)

(52) U.S. Cl.
CPC ............... *G06N 3/08* (2013.01); *G06N 3/063* (2013.01)

(58) Field of Classification Search
CPC ............. G06N 3/08; G06N 3/063; G06N 3/06
See application file for complete search history.

(56) References Cited

U.S. PATENT DOCUMENTS

| | | | |
|---|---|---|---|
| 10,152,970 B1* | 12/2018 | Olabiyi | G10L 13/027 |
| 2018/0075581 A1 | 3/2018 | Shi et al. | |
| 2018/0137389 A1 | 5/2018 | Mathieu et al. | |
| 2019/0046068 A1 | 2/2019 | Ceccaldi et al. | |
| 2019/0065956 A1 | 2/2019 | Qian et al. | |
| 2019/0102359 A1* | 4/2019 | Knag | G06G 7/16 |
| 2019/0156183 A1* | 5/2019 | Durham | G06N 3/0472 |
| 2019/0311267 A1* | 10/2019 | Qin | G06N 3/084 |
| 2020/0193300 A1* | 6/2020 | Kumar | G06N 3/0445 |
| 2020/0285939 A1* | 9/2020 | Baker | G06N 3/082 |

OTHER PUBLICATIONS

S. Xiao et al., "GST-memristor-based online learning neural networks", 2018. (Year: 2018).*
D. Soudry, D. Di Castro, A. Gal, A. Kolodny and S. Kvatinsky, "Memristor-Based Multilayer Neural Networks With Online Gradient Descent Training," in IEEE Transactions on Neural Networks and Learning Systems, vol. 26, No. 10, pp. 2408-2421, Oct. 2015 (Year: 2015).*
Naveed Akhtar et al., "Threat of Adversarial Attacks on Deep Learning in Computer Vision: A Survey", Digital Dbject Identifier, Feb. 2018.
Angus Galloway et al., "Attacking Binarized Neural Networks", arXiv:1711.00449v2 [cs.LG], Jan. 2018.

(Continued)

*Primary Examiner* — Ying Yu Chen
*Assistant Examiner* — Brian J Hales
(74) *Attorney, Agent, or Firm* — Tutunjian & Bitetto, P.C.; Randy Emilio Tejeda

(57) ABSTRACT

Methods, systems, and circuits for training a neural network include applying noise to a set of training data across wordlines using a respective noise switch on each wordline. A neural network is trained using the noise-applied training data to generate a classifier that is robust against adversarial training.

20 Claims, 7 Drawing Sheets

(56) References Cited

OTHER PUBLICATIONS

Linh Nguyen et al., "A Learning and Masking Approach to Secure Learning", arXiv:1709.04447v4 [cs.CR], Jan. 2018.
Yinqi Tang, "Scaling Up In-Memory-Computing Classifiers via Boosted Feature Subsets in Banked Architectures", IEEE Transactions on Circuits and Systems—II: Express Briefs, vol. 66, No. 3, Mar. 2019.
Jintao Zhang et al., "In-Memory Computation of a Machine-Learning Classifier in a Standard 6T SRAM Array", IEEE Journal of Solid-State Circuits, vol. 52, No. 4, Apr. 2017.

* cited by examiner

INTEGRATED NOISE GENERATION FOR ADVERSARIAL TRAINING

BACKGROUND

The present invention generally relates to machine learning systems and, more particularly, to generating noise for use in resisting adversarial training attacks in a manner that is integrated with an in-memory computing architecture.

Adversarial training is a technique for attacking systems that employ machine learning. By providing malicious inputs to the machine learning system, adversarial training causes the learned model to adapt to input that is not representative of the expected input. Adversarial training can thereby trick a machine learning system into accepting or rejecting inputs that its designers did not intend.

SUMMARY

A method for training a neural network includes applying noise to a set of training data across wordlines using a respective noise switch on each wordline. A neural network is trained using the noise-applied training data to generate a classifier that is robust against adversarial training.

A machine learning classification system includes a hardware neural network that has weights formed from static random-access memory cells that are accessed by respective wordlines. A noise switch on each wordline is configured to add a random noise value to the respective wordline that is proportional to a signal magnitude on the wordline. A neural network trainer is configured to train the neural network using training data, with noise added by the noise switches, to generate a classifier that is robust against adversarial training.

A noise switch circuit accepts a wordline input. A first noise-enable switch is configured to set a noise magnitude that is proportional to a signal magnitude from the wordline input. A noise-sign switch is configured to apply a signal having the noise magnitude and a noise sign to the wordline input.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

When designing and training machine learning models, it is advantageous to provide a training input that will train the model to be robust against adversarial training. Toward this end, noise can be added to the training input. This strengthens the machine learning model against attacks that simply flip bits or otherwise change the values of some inputs by including training data that deviates slightly from the expected inputs.

Some forms of machine learning systems can be implemented in hardware. In some particular examples, a neural network weight array can be implemented directly in a static random access memory (SRAM) array. The present embodiments introduce noise into such systems at the hardware level, directly altering an input signal in a manner that is generally proportional to the strength of the input signal. In other words, the magnitude of the noise that is added to the input signal, expressed by the high and low limits of the noise's range, will be proportional to the absolute magnitude of the input signal. This helps make the added noise strong enough to be a significant fraction of the input signal, so that it will have a substantial effect on the training effect of the input signal.

Figure 1:
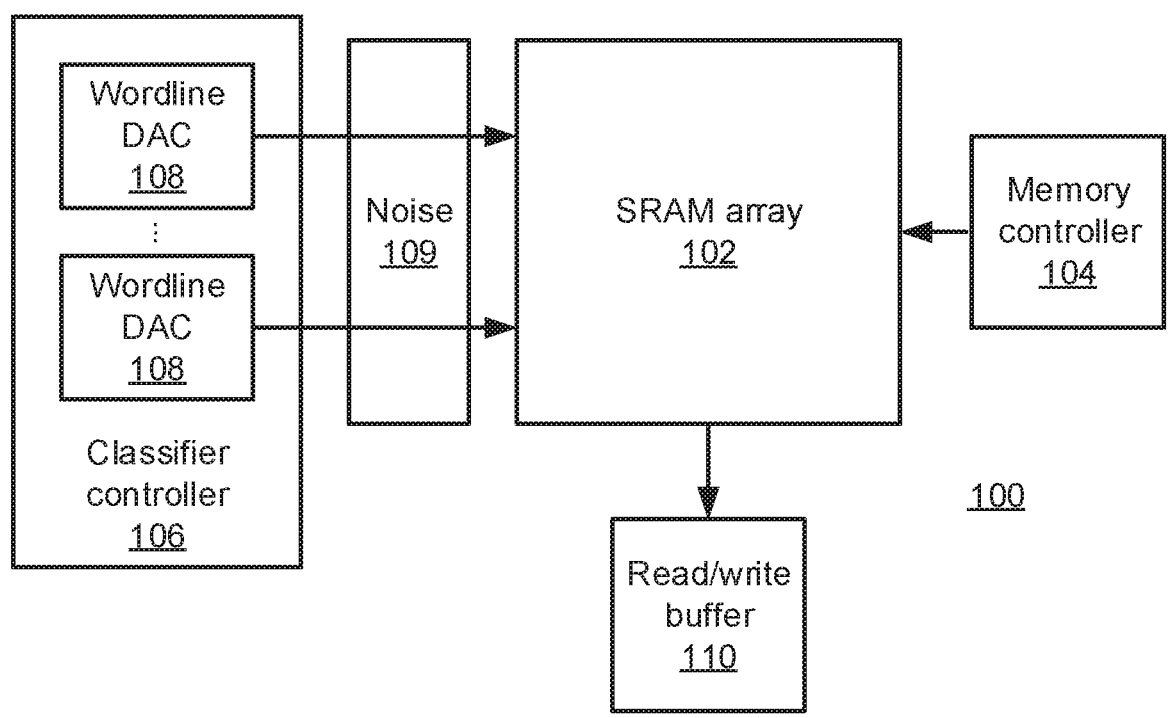
FIG. 1 is a block diagram of an in-memory machine learning system that uses static random access memory (SRAM) cells as the weights of a machine learning classifier and that is trained using adversarial training and noise injection in accordance with an embodiment of the present invention.

Referring now to FIG. 1, an in-memory machine learning system 100 is shown that includes noise insertion for training. An SRAM array 102 is shown and can operate in either a memory mode or in a classifier mode. Although the SRAM array 102 can be implemented as any appropriate architecture and have any appropriate size, it is specifically contemplated that the SRAM array 102 can be formed from an array of 128×128 six-transistor (6T) SRAM cells.

A memory controller 104 communicates with the SRAM array 102 and provides read/write instructions when using the SRAM array 102 in a memory mode. For example, the memory controller 104 sends SRAM-enable signals that allow a read/write buffer 110 to read stored values and to change those values. It should be noted that the memory controller 104 is not needed for embodiments that specifically implement the classifier functionality of the system 100.

A classifier controller 106 also communicates with the SRAM array 102 and provides control signals to operate the SRAM array 102 in a classifier mode. In particular, the classifier controller 106 can include a set of wordline digital-to-analog converters (DACs) 108 that provide respective analog wordline signals to the SRAM array 102. As the wordline signals pass to the SRAM array 102, noise 109 is inserted on some or all of the wordlines, either adding to or subtracting from the magnitude of the wordline signals.

Figure 2:
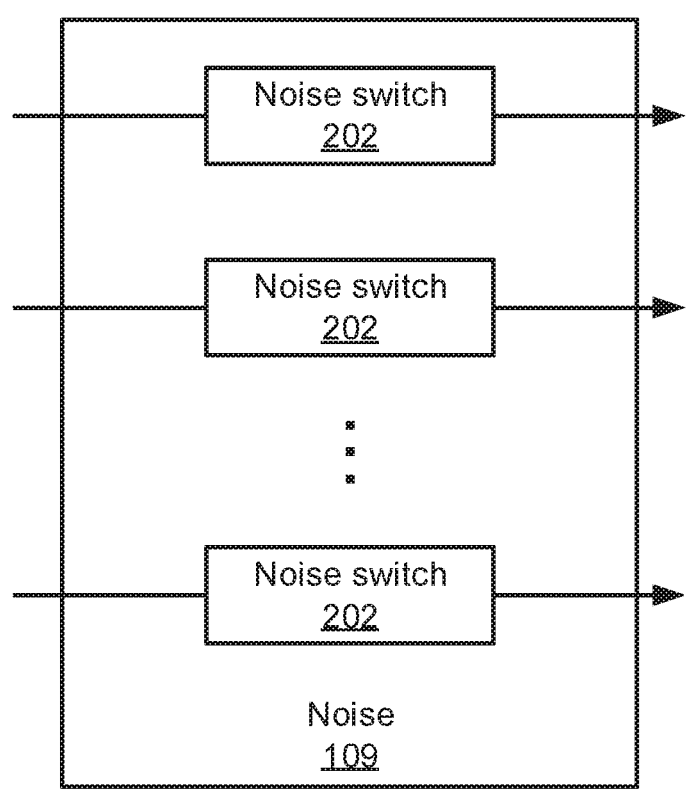
FIG. 2 is a block diagram of a set of noise switches that operate on inputs to a set of SRAM cells to inject noise for adversarial training in accordance with an embodiment of the present invention.

Referring now to FIG. 2, additional detail on the noise block 109 is shown in relation to the wordlines. Each wordline passes through a respective noise switch 202. The noise switch 202 determines whether to add noise to the wordline, for example responsive to a noise-enable signal, how much noise to add, and whether the noise's contribution is positive or negative. Each noise switch 202 therefore receives, for example, a noise-enable signal and a random number signal that reflects an output of an appropriate random-number generator or pseudo-random number generator.

Figure 3:
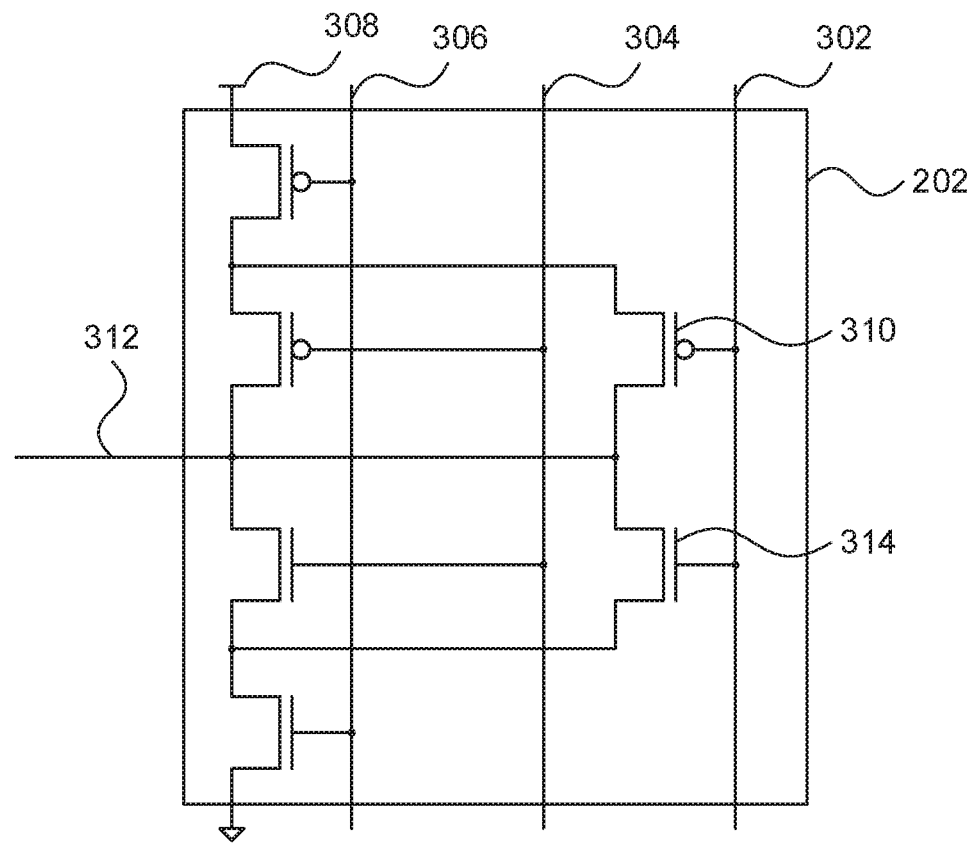
FIG. 3 is a circuit schematic of a noise switch that operates on a wordline to inject noise for adversarial training in accordance with an embodiment of the present invention.

Referring now to FIG. 3, additional detail on the noise switch 202 is shown. The noise switch receives the wordline 312 as an input. Additionally, three control signals are applied: noise_enable_1 302, noise_enable_2 304, and noise_sign 306. The noise_enable signals 302 and 304 determine a magnitude of the noise signal that is added to the wordline 312, while the noise_sign signal 306 determines whether the noise amplitude is added to, or subtracted from, the amplitude of the wordline signal 312.

Each of the signals noise_enable 1 302, noise_enable_2 304, and noise_sign 306 feeds into a respective pair of transistors including a p-type transistor 310 and an n-type transistor 314. The wordline 312 connects to the noise switch 202 at two points, between respective pairs of transistors. It is specifically contemplated that these transistors could be implemented as field-effect transistors (FETs) such as metal-oxide-semiconductor FETs (MOSFETs). The noise_enable signals 302 and 304 thus govern the strength of the noise added, while the noise_sign signal 306 triggers a switch that either introduces a current proportional to the noise strength from power supply 308 or diverts such a current to ground. It should be noted that the values of the noise_enable_1 signal 302 and the noise_enable_2 signal 304 can be controlled globally, such that the same value is used for each of the noise switches 202. It should be noted that each wordline 312 can connect to access transistors of a line of bit cells, such that the output of the wordline 312 is tied to each bit cell.

If no noise is added, then the voltage on the wordline is $V_{WL} = s \times X_i$. If noise is enabled by the noise_enable_1 signal 302, then the voltage on the wordline becomes $V_{WL} = S \times X_i - I_{noise} \times t_{pulse}$, where $$I_{noise} = k\left((V_{DD} - V_{th})V_{WL} - \frac{V_{WL}^2}{2}\right) \approx k(V_{DD} - V_{th})V_{WL},$$

$X_i$ is an input signal on the $i^{th}$ wordline, $V_{DD}$ is a power supply voltage and $V_{th}$ is a transistor threshold voltage. The value of $t_{pulse}$ is a calibrated parameter that is set according to external factors and has an exemplary value of about 50 ns. The term s is used to illustrate that the base value of $V_{WL}$ is proportional to the digital input value $X_i$ at the $i^{th}$ row and can take any appropriate value. This expression of the noise current $I_{noise}$ shows that the noise current is proportional to the difference between the wordline voltage $V_{WL}$ and the threshold voltage of the transistor. Thus, because $V_{WL}$ is linearly related to $X_i$, and $I_{noise}$ is linearly related to $V_{WL}$, the noise current is linearly related to the wordline voltage. In some embodiments, both noise_enable signals can be activated to provide both a positively-related current ($I_{noise+}$) and a negatively-related current ($I_{noise-}$), with the wordline voltage being affected by both noise values.

In some embodiments, the contribution of the transistors connected to the noise_enable_1 line 302 can be larger or smaller than the contribution of the connected to the noise_enable_2 line 304. For example, if one set of transistors supplies a current that is twice as large as the other set of transistors, then the two signals 302/304 can be used to set four distinct levels of noise, with the two signals 302/304 representing two bits of magnitude. During operation, the noise_enable signals 302/304 will only add to or subtract from the wordline 312 if their respective signs agree with the sign of the noise-sign signal 306. Thus, a three-bit random value (two bits of magnitude and one of sign) is generated and input to the noise_enable lines 302/304 and the noise_sign line 306 to determine an amount of current that is added to, or subtracted from, the current on the wordline 312.

Figure 4:
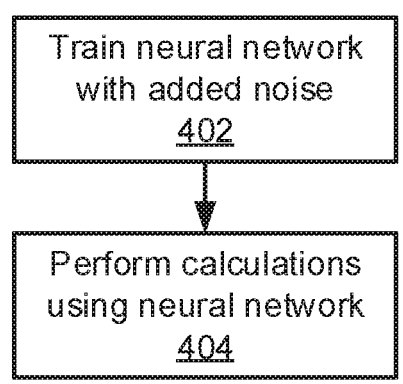
FIG. 4 is a block/flow diagram of a method for training and using a machine learning classifier that is robust against adversarial training by the addition of noise in accordance with an embodiment of the present invention.

Referring now to FIG. 4, a general method for training and using a neural network in a manner that is robust against adversarial training attacks is shown. Block 402 trains the neural network with noise added to the training data. By adding noise to the training data, adversarial training that attempts to tailor its input to the neural network will be less effective, because the neural network will be prepared to handle more varied types of inputs. Block 404 then performs calculations using the neural network, appropriately handling noisier inputs than would have been possible if only clean training data had been used.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 5:
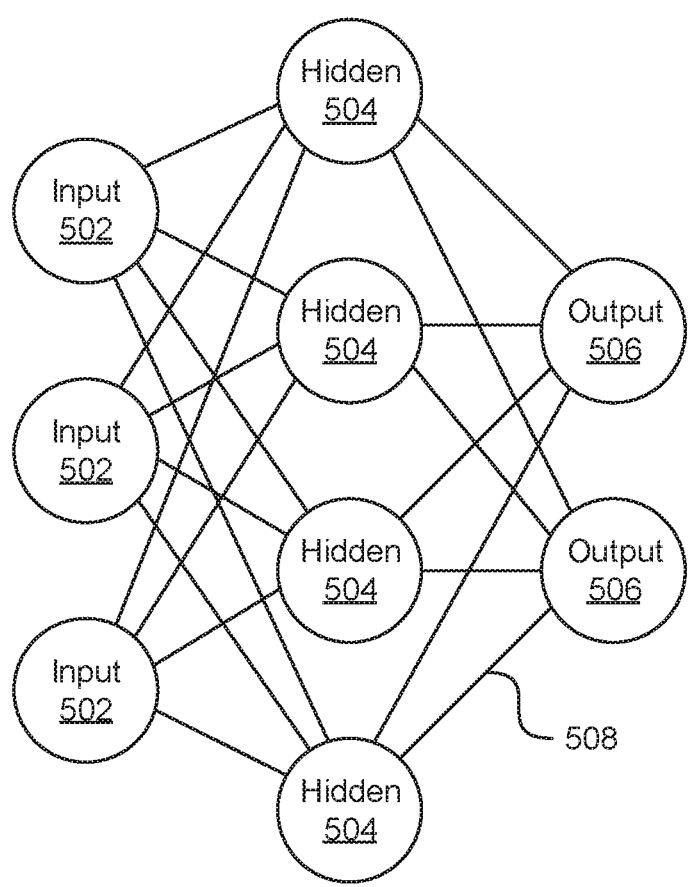
FIG. 5 is a diagram of an exemplary neural network system in accordance with an embodiment of the present invention.

Referring now to FIG. 5, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 502 that provide information to one or more "hidden" neurons 504. Connections 508 between the input neurons 502 and hidden neurons 504 are weighted and these weighted inputs are then processed by the hidden neurons 504 according to some function in the hidden neurons 504, with weighted connections 508 between the layers. There can be any number of layers of hidden neurons 504, and as well as neurons that perform different functions. There exist different neural network structures as well, such as convolutional neural network, maxout network, etc. Finally, a set of output neurons 506 accepts and processes weighted input from the last set of hidden neurons 504.

This represents a "feed-forward" computation, where information propagates from input neurons 502 to the output neurons 506. Upon completion of a feed-forward computation, the output is compared to a desired output available from training data. The error relative to the training data is then processed in "feed-back" computation, where the hidden neurons 504 and input neurons 502 receive information regarding the error propagating backward from the output neurons 506. Once the backward error propagation has been completed, weight updates are performed, with the weighted connections 508 being updated to account for the received error. This represents just one variety of ANN.

It should be understood that, although the noise insertion described herein is provided specifically with respect to an SRAM-based embodiment, any appropriate hardware neural network architecture can benefit from the same. For example, rather than being implemented with SRAM cells, the weights 508 of a neural network can be implemented with resistive processing units (RPUs). RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Furthermore, the layers of neurons and the weights connecting them are described in a general manner and can be replaced or supplemented by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complex forms of interconnection.

Figure 6:
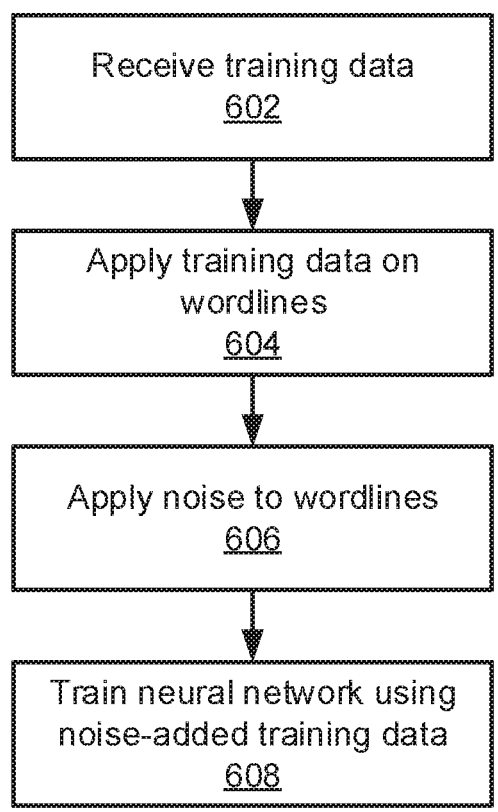
FIG. 6 is a block/flow diagram of a method for training a neural network using added noise to generate a classifier that is robust against adversarial training in accordance with an embodiment of the present invention.

Referring now to FIG. 6, additional detail is provided on the method for training the neural network in block 402. Block 602 receives training data. In some embodiments, the training data may be image data that is made up of a set of pixels. In such an embodiment, each pixel represents a different datapoint that can be provided on a respective wordline 312 in block 604. Block 606 applies noise to the wordlines 312 using the respective noise switches 202. The noise-added training data is then used to train the weights 508 of the neural network through an appropriate training mechanism, adjusting the values stored in the weights 508 so that input data will provide correct classification results, even if the input data has been altered in an adversarial training attack.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 7:
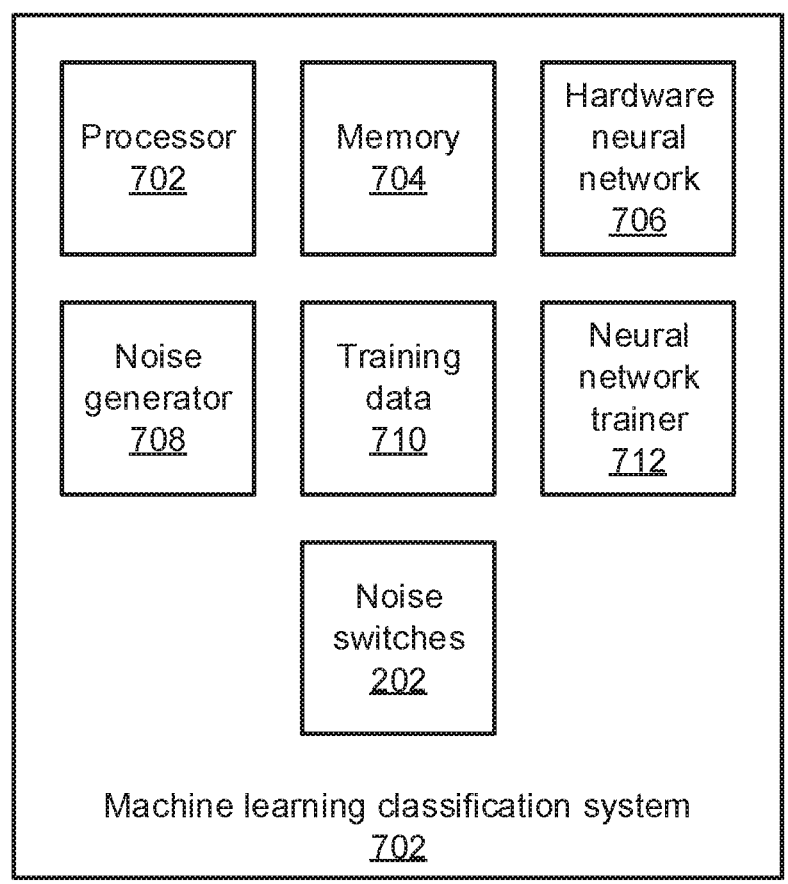
FIG. 7 is a block diagram of a machine learning classification system that uses SRAM cells as the weights of a machine learning classifier and that is trained using adversarial training and noise injection in accordance with an embodiment of the present invention.

Referring now to FIG. 7, a machine learning classification system 702 is shown. The system 702 includes a hardware processor 702 and a memory 704. A hardware neural network 706 is implemented using, for example, one or more arrays of SRAM cells that act as weights. A neural network trainer 712 uses a set of training data 710 that is stored in the memory 704, along with noise generated by the noise generator, to train the values stored in the weights of the hardware neural network 706. As noted above, noise switches 202 control how the noise from the noise generator 708 is applied to the training data 710 before it is used to train the hardware neural network 706.

Figure 8:
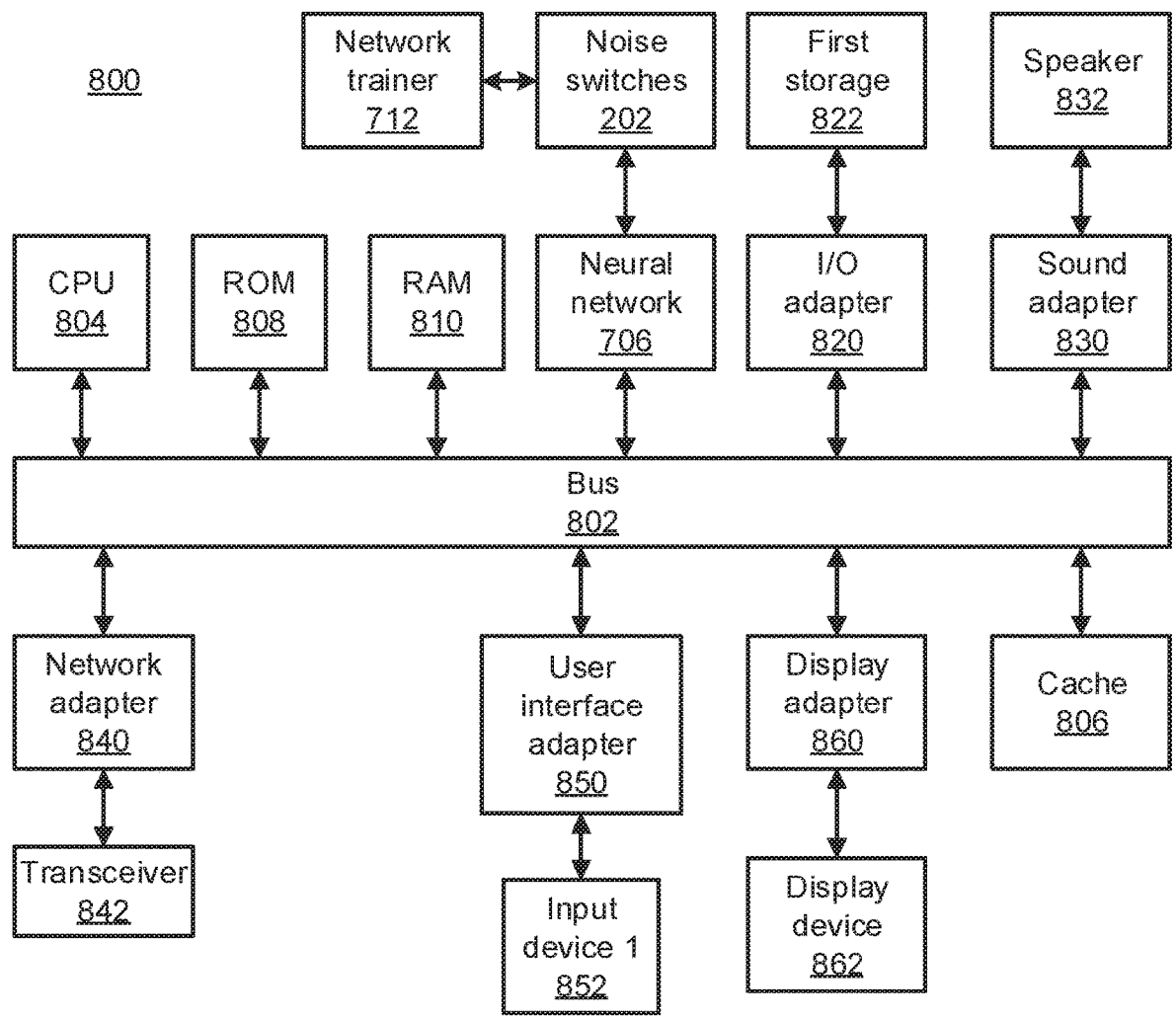
FIG. 8 is a processing system that can implement the machine learning classification system in accordance with an embodiment of the present invention.

Referring now to FIG. 8, an exemplary processing system 800 is shown which may represent the machine learning classification system 702. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 is operatively coupled to system bus 802 by the I/O adapter 820. The storage device 822 can be any of a disk storage device (e.g., a magnetic or optical disk storage device), a solid state magnetic device, and so forth. The storage device 822 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852 is operatively coupled to system bus 802 by user interface adapter 850. The user input device 852 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 852 can be the same type of user input device or different types of user input devices. The user input device 852 is used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Having described preferred embodiments of integrated noise generation for adversarial training (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for training a neural network, comprising:
   applying noise to a set of training data across a plurality of wordlines using a respective noise switch on each wordline; and
   training a neural network, which is separate from the respective noise switch on each wordline, using the noise-applied training data to generate a classifier.

2. The method of claim 1, wherein applying noise includes applying a first noise magnitude signal, which controls a magnitude of a noise applied, and a noise sign signal, which controls whether noise is added or subtracted, to each respective noise switch.

3. The method of claim 2, wherein applying noise further includes applying a second noise magnitude signal to further control the magnitude of the noise applied.

4. The method of claim 2, wherein the first noise magnitude signal controls a first pair of transistors in the noise switch, including one p-type transistor and one n-type transistor.

5. The method of claim 2, wherein the noise sign signal controls a second pair of transistors in each respective noise switch, including one p-type transistor and one n-type transistor, that determine whether current is added to the respective wordline or diverted from the respective wordline.

6. The method of claim 5, wherein applying noise to the set of training data is performed when a sign on the noise sign signal matches a sign on the first noise magnitude signal.

7. The method of claim 1, wherein the neural network comprises weights formed from static random-access memory cells.

8. The method of claim 1, wherein the noise that is applied to the set of training data has a magnitude that is proportional to a magnitude of each respective element of the set of training data.

9. A machine learning classification system, comprising:
   a hardware neural network that includes weights formed from static random-access memory cells that are accessed by respective wordlines;
   a noise switch on each wordline of the respective wordlines that is configured to add a random noise value to the respective wordline that is proportional to a signal magnitude on the wordline; and
   a hardware processor configured to train the neural network using training data, with noise added by the noise switches on the respective wordlines, to generate a classifier.

10. The machine learning classification system of claim 9, wherein each noise switch accepts as input a first noise magnitude signal, which controls a magnitude of a noise applied, and a noise sign signal, which controls whether noise is added or subtracted, to each respective noise switch.

11. The machine learning classification system of claim 10, wherein each noise switch further accepts as input a second noise magnitude signal to further control the magnitude of the noise applied.

12. The machine learning classification system of claim 10, wherein each noise switch comprises a first pair of transistors in the noise switch, including one p-type transistor and one n-type transistor, that are controlled by the first noise magnitude signal.

13. The machine learning classification system of claim 10, wherein each noise switch comprises a second pair of transistors in the noise switch, including one p-type transistor and one n-type transistor, that are controlled by the noise sign signal to determine whether current is added to the respective wordline or diverted from the respective wordline.

14. The machine learning classification system of claim 9, wherein the hardware processor is further configured to provide pseudo random number generator that is configured to control each noise switch.

15. A noise switch circuit, comprising:
    a wordline input;
    a first noise-enable switch configured to set a noise magnitude that is proportional to a signal magnitude from the wordline input; and
    a noise-sign switch configured to apply a signal having the noise magnitude and a noise sign to the wordline input.

16. The noise switch circuit of claim 15, wherein the first noise-enable switch comprises an n-type transistor and a p-type transistor and accepts a first noise magnitude signal as input to determine a first noise contribution.

17. The noise switch circuit of claim 16, further comprising a second noise-enable switch that includes an n-type transistor and a p-type transistor and accepts a second noise magnitude signal as input to determine a second noise contribution.

18. The noise switch circuit of claim 17, wherein the first noise-enable switch and the second noise-enable switch are connected in parallel to one another.

19. The noise switch circuit of claim 18, wherein the first noise-enable switch and the second noise-enable switch are connected in series with the noise-sign switch.

20. The noise switch circuit of claim 19, wherein the noise sign switch is connected in series with a power supply.

* * * * *